A. J. E. PRUEFERT.
POULTRY DRINKING FOUNTAIN.
APPLICATION FILED OCT. 27, 1914.
1,226,594. Patented May 15, 1917.
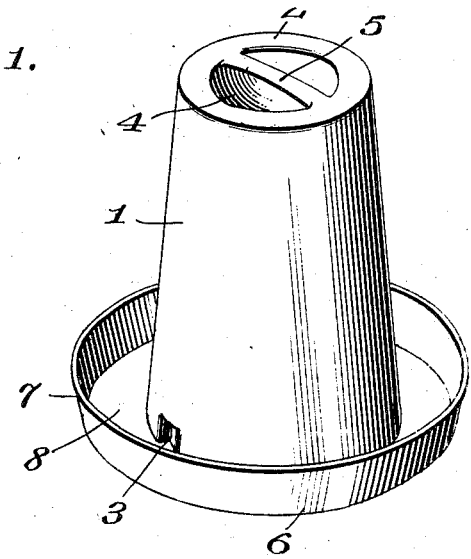
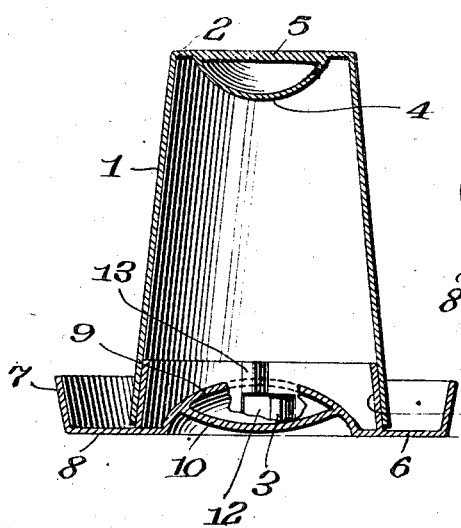
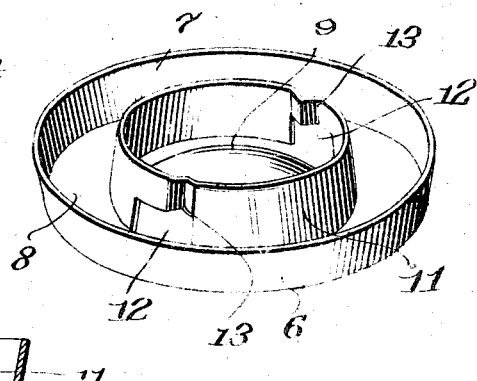
Inventor
A. J. E. Pruefert,
By Victor J. Evans
Attorney
Witnesses
Gerald Hennesy
J. W. Garner

UNITED STATES PATENT OFFICE.

AUGUST J. E. PRUEFERT, OF EAST AURORA, NEW YORK.

POULTRY DRINKING-FOUNTAIN.

1,226,594.

Specification of Letters Patent.

Patented May 15, 1917.

Application filed October 27, 1914. Serial No. 868,883.

*To all whom it may concern:*

Be it known that I, AUGUST J. E. PRUEFERT, a citizen of the United States, residing at East Aurora, in the county of Erie and State of New York, have invented new and useful Improvements in Poultry Drinking-Fountains, of which the following is a specification.

This invention is an improved drinking fountain especially adapted for use for watering poultry, the object of the invention being to provide an improved device of this character wherein the water flows on the barometric principle, and which is made of two parts detachably connected by bayonet joints, their slots forming the passageway for the water when the parts are connected and the device stands in working position.

A further object is to provide a device of this character which is strong and durable, is cheap and simple, keeps the water from becoming contaminated by the poultry, which automatically supplies water as needed and which prevents water from being wasted.

The invention consists in the construction, combination and arrangement of devices hereinafter described and claimed.

In the accompanying drawings:—

Figure 1 is a perspective view of a poultry drinking fountain constructed in accordance with my invention.

Fig. 2 is a vertical sectional view of the same.

Fig. 3 is a perspective view of the tray for the base of the fountain.

In accordance with my invention I provide a reservoir 1 which is here shown as of frusto-conical form and as provided with a top 2. The reservoir is open at the lower end and is provided at its lower end and at opposite sides, with inwardly extending lugs 3 which are struck up therefrom, are integral therewith, and are V-shaped or substantially so in cross section. The top of the reservoir is flat except for a depressed central portion 4 across which, and level with the top, extends a handle bar 5.

The base of the fountain is formed by a tray 6 comprising an upwardly and outwardly inclined outer wall 7, and a bottom 8 which includes a flat annulus and a concavo-convex central projection 9, struck up integrally therefrom. A curved handle bar 10 is arranged across the recess formed by the concavity, is secured to the wall of the said projection and is spaced above the level of the bottom of the tray, so as to be out of the way when the device is in use. The diameter of the tray considerably exceeds that of the lower end of the reservoir. The tray is also provided with a collar 11, which is arranged concentrically with it, the wall of which inclines inwardly and upwardly and the diameter of the collar is such as to cause it to fit in the lower end of the reservoir when the latter is placed on the tray. The collar is provided in opposite sides with bayonet joint elements produced by cutting openings 12 in its lower edge and pressing lugs 13 inward from one end of the metal strips left above the openings. These lugs are preferably V-shaped and slightly larger than the lugs 3.

In the use of this device, the parts are disconnected and reversed from the position shown in Fig. 1, and the desired quantity of water poured into the reservoir, which may now be stood on a level surface because its top 2 is flat and the handle bar 3 does not project. The base is next brought over the now open upper end of the reservoir and moved downwardly so that the collar 11 enters and may be pushed into said end, to make a close connection therewith at a time when the upper extremity of the reservoir does not quite touch the annular portion of the pan. The lugs 3 have now been passed through the lugs 13, and by rotating the parts on each other slightly, the lugs 3 are caused to move longitudinally within the slots 12, as usual with bayonet joint connections so that the parts are detachably connected by what is substantially a ground joint, which minimizes the escape of water and the possibility that the parts will become accidentally disconnected. Now the complete device can be carried about by the handle 10, and no water can escape.

When the fountain has been brought to the point of use, it is only necessary to invert it and stand it on the flat bottom of the pan, and this can be done because the handle 10 does not project. At this time and afterward, the device can be moved by the handle 5. In this position, (which is that shown in Figs. 1 and 2), the lower portions of the openings 12, which are not covered by the lower end of the reservoir body, constitute outlets to permit water from the reservoir to flow out to the tray and keep the latter supplied. The reservoir having been initially filled, is first attached to the tray, in inverted position. When the reservoir is arranged for use, with the tray lowermost and serving as a support, the column of water is held in the reservoir by air pressure and from time to time as water is consumed by the fowls the reservoir permits the flow of more water to the tray, thereby automatically keeping the tray supplied with water and keeping the water in the tray at a certain level as long as there is a supply in the reservoir. The upwardly extending offset portion 9 of the tray by displacing water keeps the outstanding portion of the tray supplied when the water gets low in the reservoir.

In practice my improved drinking fountain may be made of sheet metal or any other suitable material and may be of any suitable size and the parts thereof may be proportioned as required.

Having thus described my invention, I claim:—

In a barometric drinking fountain, a tray including a bottom, a peripheral wall, and an upstanding frusto-conical collar having at intervals one element of a bayonet joint consisting of a horizontal slot through the collar at its lower edge and a lug pressed radially inward from one end of the strip above said slot; combined with a frusto-conical reservoir whose upper end is closed and whose lower end is open and of an internal diameter to fit closely around said collar when its lower edge stands slightly above the bottom of the tray, thereby leaving said slots partly open for passage of water, and complementary bayonet joint elements consisting of lugs pressed inward from the metal of the reservoir at points to register with those in said strips and of a size to permit them to be passed therethrough and then moved within the slots as the reservoir is turned with respect to the collar.

In testimony whereof I affix my signature in presence of two witnesses.

AUGUST J. E. PRUEFERT.

Witnesses:
MAE DORÉ RUST,
HENRY REALING.